(12) United States Patent
Hagiwara et al.

(10) Patent No.: US 11,177,060 B2
(45) Date of Patent: Nov. 16, 2021

(54) PERMANENT MAGNET, ROTARY ELECTRIC MACHINE, AND VEHICLE

(71) Applicant: KABUSHIKI KAISHA TOSHIBA, Tokyo (JP)

(72) Inventors: Masaya Hagiwara, Kanagawa (JP); Shinya Sakurada, Tokyo (JP); Keiko Okamoto, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 235 days.

(21) Appl. No.: 16/283,876

(22) Filed: Feb. 25, 2019

(65) Prior Publication Data

US 2020/0090844 A1 Mar. 19, 2020

(30) Foreign Application Priority Data

Sep. 18, 2018 (JP) ............................. JP2018-173977

(51) Int. Cl.
| | |
|---|---|
| *H02K 1/02* | (2006.01) |
| *H02K 1/27* | (2006.01) |
| *H02K 1/17* | (2006.01) |
| *H02K 7/00* | (2006.01) |
| *H02K 7/18* | (2006.01) |
| *F01D 15/10* | (2006.01) |

(Continued)

(52) U.S. Cl.
CPC ............. *H01F 1/057* (2013.01); *F01D 15/02* (2013.01); *F01D 15/10* (2013.01); *H02K 1/02* (2013.01); *H02K 1/17* (2013.01); *H02K 1/276* (2013.01); *H02K 7/003* (2013.01); *H02K 7/1823* (2013.01)

(58) Field of Classification Search
CPC ...... H01F 1/057; H01F 1/0556; H01F 1/0576; H02K 1/02; H02K 1/276; H02K 7/003; H02K 1/17; H02K 7/1823; H02K 2213/03; F01D 15/10; F01D 15/02; F05D 2220/76
USPC ............................................... 310/80, 156.01
See application file for complete search history.

(56) References Cited

U.S. PATENT DOCUMENTS

| | | | |
|---|---|---|---|
| 8,222,785 B2 * | 7/2012 | Komuro .................. B82Y 10/00 310/156.01 |
| 9,715,956 B2 * | 7/2017 | Horiuchi .................. C22C 30/02 |
| 10,535,452 B2 * | 1/2020 | Hagiwara ............. H01F 1/0557 |

(Continued)

FOREIGN PATENT DOCUMENTS

| | | |
|---|---|---|
| JP | 60-100402 | 6/1985 |
| JP | 06-260359 | 9/1994 |

(Continued)

OTHER PUBLICATIONS

Miyamasu, et al. "A Study on Improvement in Permanent Magnet Synchronous Motor with High Permeability Magnet", IEEJ Transactions Industry Applications, 2013, vol. 133, No. 9. pp. 943-951.

*Primary Examiner* — John K Kim
(74) *Attorney, Agent, or Firm* — Amin, Turocy & Watson, LLP (57) ABSTRACT

A permanent magnet comprises crystal grains each including a main phase. An average size of the crystal grains is 1.0 μm or less, and a degree of orientation of easy magnetization axes of the crystal grains to an easy magnetization axis of the magnet is 15% or more and 90% or less. A recoil magnetic permeability is 1.13 or more, a residual magnetization is 0.8 T or more and less than 1.16 T, and an intrinsic coercive force is 850 kA/m or more.

12 Claims, 7 Drawing Sheets

(51) Int. Cl.
*F01D 15/02* (2006.01)
*H01F 1/057* (2006.01)

(56) References Cited

U.S. PATENT DOCUMENTS

| | | | |
|---|---|---|---|
| 2002/0117235 A1 | 8/2002 | Kanekiyo et al. | |
| 2003/0160674 A1* | 8/2003 | Komuro | H02K 1/2733 335/302 |
| 2004/0025974 A1 | 2/2004 | Lee et al. | |
| 2008/0054738 A1 | 3/2008 | Komuro et al. | |
| 2008/0066575 A1* | 3/2008 | Yang | B22F 3/18 75/229 |
| 2010/0141367 A1* | 6/2010 | Komuro | G11B 5/82 335/302 |
| 2011/0254646 A1* | 10/2011 | Komuro | G11B 5/743 335/302 |
| 2012/0205573 A1* | 8/2012 | Komuro | H01F 41/0293 252/62.51 R |
| 2013/0278104 A1* | 10/2013 | Komuro | H01F 1/08 310/156.01 |
| 2016/0155548 A1* | 6/2016 | Horiuchi | C22C 19/07 310/152 |
| 2017/0271059 A1* | 9/2017 | Horiuchi | H02K 1/06 |
| 2018/0144850 A1 | 5/2018 | Okamoto et al. | |
| 2019/0295751 A1* | 9/2019 | Hagiwara | C22C 38/005 |
| 2020/0090844 A1* | 3/2020 | Hagiwara | H01F 1/0576 |

FOREIGN PATENT DOCUMENTS

| | | |
|---|---|---|
| JP | 2003-178908 | 6/2003 |
| JP | 2005-527989 | 9/2005 |
| JP | 2008-029148 | 2/2008 |
| JP | 2008-043172 | 2/2008 |
| JP | 2008-060183 | 3/2008 |
| JP | 2011-114990 | 6/2011 |
| JP | 2012-175738 | 9/2012 |
| JP | 2015-220335 | 12/2015 |
| JP | 2017-022375 | 1/2017 |
| JP | 2018-085388 | 5/2018 |
| WO | 2017/158646 | 9/2017 |

* cited by examiner

WORKING RATIO (%) = (t1 − t2) / t1 ×100

PERMANENT MAGNET, ROTARY ELECTRIC MACHINE, AND VEHICLE

CROSS REFERENCE TO RELATED APPLICATION

This application is based upon and claims the benefit of priority from Japanese Patent Application No. 2018-173977, filed on Sep. 18, 2018; the entire contents of which are incorporated herein by reference.

FIELD

Embodiments described herein relate generally to a permanent magnet, a rotary electric machine, and a vehicle.

BACKGROUND

In automobiles, railway vehicles, and the like, it is known that a rotary electric machine such as a motor or a generator including an Nd—Fe—B-based sintered magnet is used in order to enhance efficiency. The Nd—Fe—B-based sintered magnet has a high magnetic flux density. Therefore, use of the Nd—Fe—B-based sintered magnet for the rotary electric machine makes it possible to obtain higher torque.

In the above-described motor for automobile and railway vehicle, variable speed driving ranging from low-speed rotation to high-speed rotation is performed. At this time, in a motor including a conventional Nd—Fe—B-based sintered magnet, high torque is obtained on a low-speed rotation side, but an output decreases due to generation of an induced voltage (back electromotive force) on a high-speed rotation side.

In a permanent magnet such as the Nd—Fe—B-based sintered magnet, an interlinkage magnetic flux always occurs with constant strength. At this time, the induced voltage caused by a permanent magnet increases in proportion to rotation speed. This results in that a voltage of the motor reaches an upper limit of power supply voltage and an electric current necessary for the output does not flow in the high-speed rotation. As a result, the output decreases drastically, and furthermore driving becomes impossible in a range of the high-speed rotation.

As a method of suppressing an effect of the induced voltage in the high-speed rotation, for example, a field weakening control method is cited. The field weakening control method is a method in which the magnetic flux density is decreased by generating an opposing magnetic field, thereby decreasing the number of interlinkage magnetic fluxes. However, a need of an electric current for generating the opposing magnetic field decreases motor efficiency at a time of the high-speed rotation. Furthermore, the permanent magnet having a high magnetic flux density such as the Nd—Fe—B-based sintered magnet cannot decrease the magnetic flux density sufficiently at a time of the high-speed rotation.

DETAILED DESCRIPTION

A permanent magnet comprises crystal grains each including a main phase. An average size of the crystal grains is 1.0 µm or less. A degree of orientation of easy magnetization axes of the crystal grains to an easy magnetization axis of the magnet is 15% or more and 90% or less. A recoil magnetic permeability is 1.13 or more, a residual magnetization is 0.8 T or more and less than 1.16 T, and an intrinsic coercive force is 850 kA/m or more.

Hereinafter, embodiments will be described with reference to the drawings. Note that the drawings are schematic and a relation between a thickness and a planar dimension, a ratio of thicknesses of respective layers and so on, for example, may be different from actual ones. Further, in the embodiments, practically the same components are given the same reference numeral, and explanation thereof will be omitted.

First Embodiment

Figure 1:
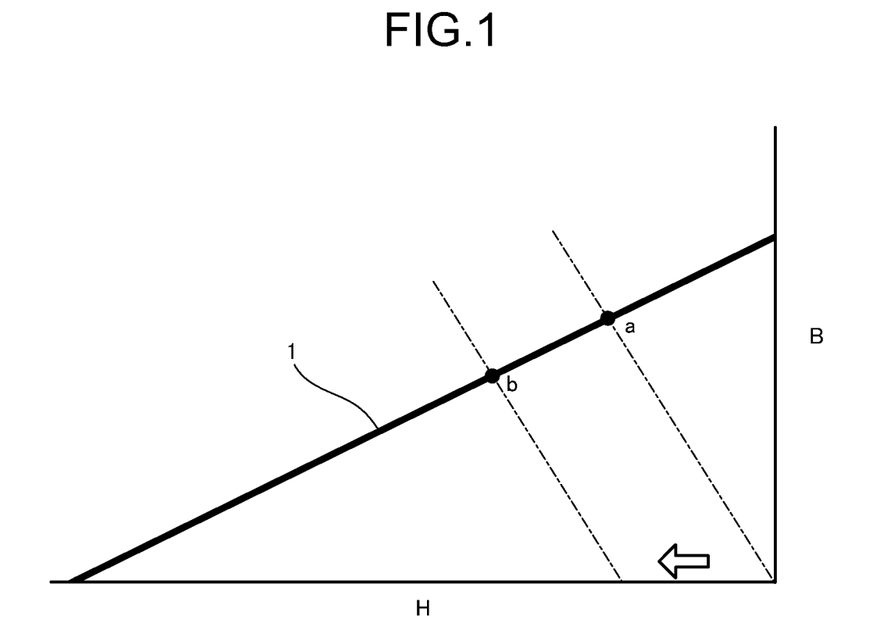
FIG. 1 is a chart illustrating an example of a magnetic property of a permanent magnet of an embodiment.
Figure 2:
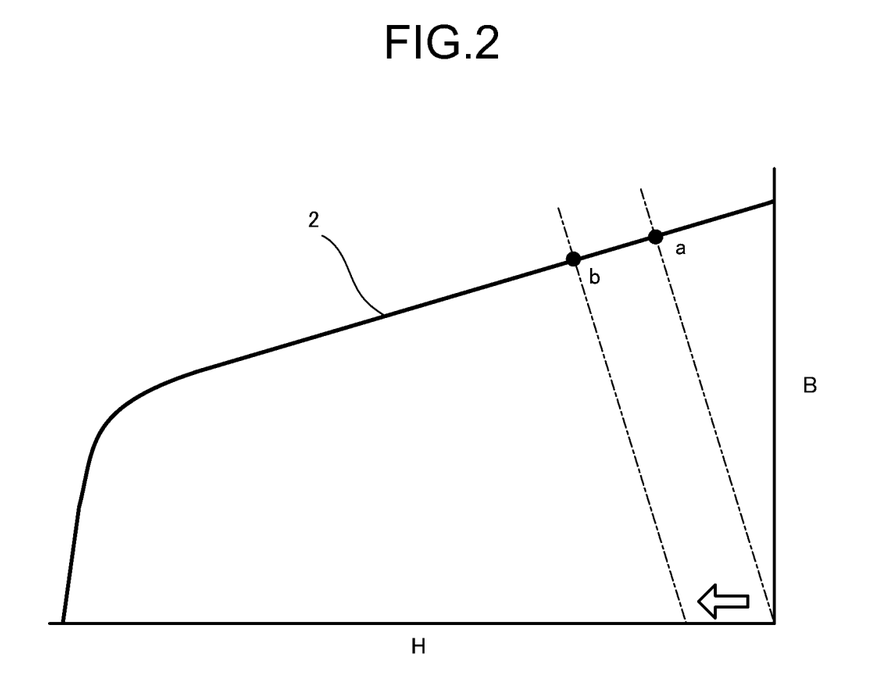
FIG. 2 is a chart illustrating an example of a magnetic property of a permanent magnet of a reference example.

In the embodiment, an example of a permanent magnet applicable to a motor performing variable speed driving from low speed to high speed will be described. FIG. 1 is a chart illustrating an example of a magnetic property of a permanent magnet of the embodiment, while FIG. 2 is a chart illustrating an example of a magnetic property of a permanent magnet of a reference example. Note that in FIG. 1 and FIG. 2, a horizontal axis indicates a magnetic field H while a vertical axis indicates a magnetic flux density B.

FIG. 1 illustrates a B-H curve 1 of the permanent magnet of the embodiment. In the permanent magnet of the embodiment, a magnetization decreased range in a change from an operating point a to an operating point b on the B-H curve 1 illustrated in FIG. 1 is large when an opposing magnetic field is applied by a field weakening control method.

In other words, a recoil magnetic permeability on the B-H curve is high in the permanent magnet of the embodiment. The recoil magnetic permeability of the permanent magnet of the embodiment is 1.13 or more, for example. The recoil magnetic permeability is preferably 1.15 or more, and further preferably 1.17 or more. An upper limit of the recoil magnetic permeability is not particularly limited, but is 1.40 or more, for example.

The recoil magnetic permeability is defined as follows. A sintered body magnet is magnetized by a magnetizing apparatus or a pulsed magnetic field. Magnetization measurement is performed to this magnet to obtain a B-H curve. A linear fit is performed to this B-H curve, thereby finding a slope. A value obtained by dividing this slope by a vacuum permeability $1.26 \times 10^{-6}$ is found as the recoil magnetic permeability. In the magnetization measurement, a minor loop is measured in an external magnetic field corresponding to operating points to be used in the rotary electric machine.

FIG. 2 illustrates a B-H curve 2 of a permanent magnet of a reference example. The permanent magnet of the reference example is a common neodymium-based sintered magnet or an Sm—Co-based sintered magnet, for example, and a recoil magnetic permeability of such a permanent magnet is ordinarily as low as 1 (one). In the case of the magnet with the low recoil magnetic permeability, a magnetization decreased range is smaller than that of the permanent magnet of the embodiment, as illustrated in FIG. 2. In other words, in the magnet with the low recoil magnetic permeability, it is difficult to decrease a magnetic flux density even by using the field weakening control method.

In the field weakening control method, a magnetic flux of a magnet is cancelled by a magnetic flux by a field weakening current. However, spatial waveforms of the magnetic flux by the field weakening current and the magnetic flux of the magnet are different from each other. Accordingly, even if a magnetic flux of a spatial fundamental wave component can be cancelled, a spatial harmonic component is not cancelled, or enlarged in some cases.

The spatial harmonic wave component causes core loss and magnet eddy current loss at a time of high-speed rotation. Further, the magnet eddy current loss raises a magnet temperature, thereby making thermal demagnetization liable to occur. In an embedded magnet type, in particular, a magnet magnetic flux approximates a square wave and includes many spatial harmonics. Further, because of a small gap length, a spatial harmonic of a slot ripple component is large, to thus cause a significant problem. A low-order spatial harmonic that is not cancelled to thus remain is modulated by a slot ripple to be a high-order spatial harmonic, which is thought as one reason.

Examples of a magnet having a high recoil magnetic permeability include a bond magnet, an Al—Ni—Co-based magnet in an incomplete magnetization state, and so on. However, these magnets have low residual magnetizations, and it is difficult to obtain high torque by low-speed rotation.

As a magnet having high recoil magnetic permeability and residual magnetization, there is cited an Sm—Co-based sintered magnet in which a recoil magnetic permeability is increased by use of a pinning-type coercive force mechanism. However, since a residual magnetization of the Sm—Co-based sintered magnet has a value as high as 1.16 T or more, an effect to suppress a field weakening current is small in weakening a flux by using the field weakening control method.

In contrast, the permanent magnet of the embodiment has a recoil magnetic permeability of 1.13 or more and has a residual magnetization of 0.8 T or more and less than 1.16 T. Thus, sufficient torque can be obtained at a time of low-speed rotation and a magnetic flux is weak at a time of high-speed rotation, which brings about a significant effect to suppress a field weakening current. The residual magnetization is preferably 0.82 T or more and less than 1.16 T, more preferably 0.85 T or more and less than 1.16 T, and further preferably 0.9 T or more and less than 1.16 T.

The permanent magnet of the embodiment has the high recoil magnetic permeability, and in addition, has the residual magnetization suitable for motor control using the field weakening control method. Therefore, it is possible to suppress a decrease in output at a time of high-speed rotation or to reduce an electric current for generating an opposing magnetic field when the field weakening control method is used, in a motor performing variable speed driving ranging from low speed to high speed.

In the above-described motor, a rotor is provided by disposing a plurality of magnetic poles inside an iron core of the rotor. Further, a stator is disposed in an outer periphery of the rotor via an air gap. Further, an armature winding is provided around the stator. By a magnetic field made by the above-described armature winding, a flux quantum of permanent magnets constituting the magnetic poles in the rotor can be changed reversibly. However, two types or more of magnets are needed, to thereby cause a complicated structure, and further to cause a problem that the number of manufacturing processes also increases.

In contract to this, as for the permanent magnet of the embodiment, the single magnet has both properties of high magnetization and a high recoil magnetic permeability, to thus make it possible to simplify a structure of a motor and suppress an increase in number of manufacturing processes.

Further, the permanent magnet of the embodiment has a high intrinsic coercive force. The intrinsic coercive force of the permanent magnet is 850 kA/m or more. The intrinsic coercive force is preferably 900 kA/m or more, and further, more preferably 1000 kA/m or more. Note that an upper limit of the intrinsic coercive force is not particularly limited, but is 3000 kA/m or more, for example.

Figure 3:
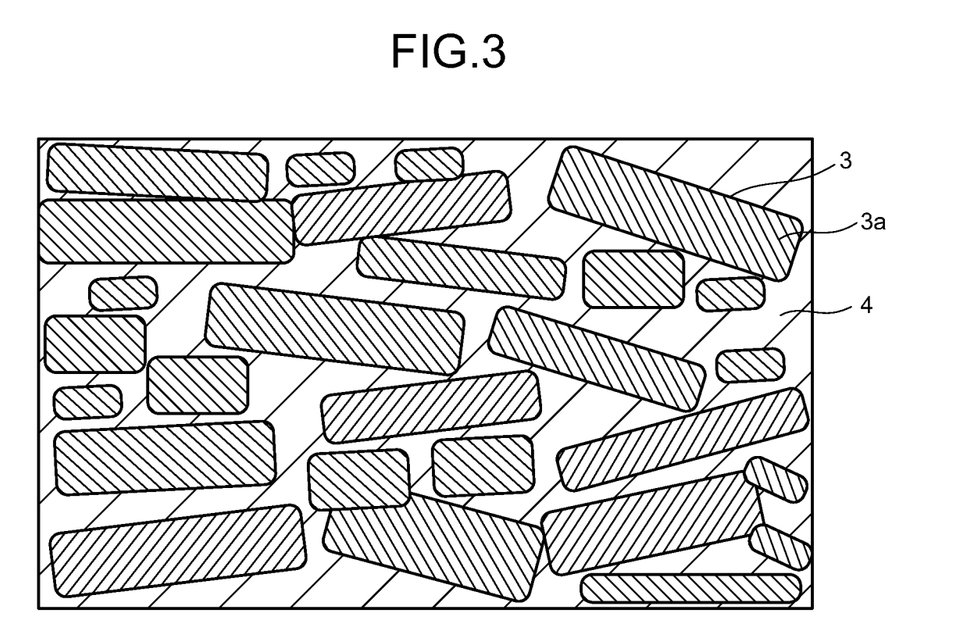
FIG. 3 is a view illustrating an example of a metal structure of the permanent magnet of the embodiment.

Next, a structure example of the permanent magnet having the above-described recoil magnetic permeability, residual magnetization, and intrinsic coercive force will be described. FIG. 3 is a cross-sectional schematic view illustrating a structure example of a metal structure of the permanent magnet of the embodiment. The metal structure illustrated in FIG. 3 has crystal grains 3 having main phases 3a (also referred to as main phase crystal grains) and grain boundary phases 4 provided among the crystal grains 3. The crystal grain 3 sometimes has an amorphous phase or a crystal phase (sub phase) which is different from the main phase 3a, or has impurities. The main phase is a phase having the highest volume occupancy ratio among the respective crystal phases and amorphous phases.

The main phase 3a is preferably an R—Fe—B-based magnetic phase (R is at least one element selected from a group consisting of Nd, Pr, Dy, Tb, and Ho) or an R—Co-based magnetic phase (R is at least one element selected from a group consisting of rare-earth elements).

In the case where the main phase 3a is the R—Fe—B-based magnetic phase, 50 atomic % or more of the R element is preferable to be Nd. Thereby, the intrinsic coercive force of the magnet can be increased. When the R element includes Nd, the R—Fe—B-based magnetic phase may have an Nd—Fe—B-based magnetic phase such as an $Nd_2Fe_{14}B$-type crystal phase, for example. By forming the Nd—Fe—B-based magnetic phase, a high residual magnetization can be obtained. Further, since Co is not contained, low-cost manufacturing is possible.

A concentration of the R element of the grain boundary phase 4 is preferably higher than a concentration of the R element of the R—Fe—B-based magnetic phase. For example, when an Nd concentration of the grain boundary phase 4 is higher than an Nd concentration of the R—Fe—B-based magnetic phase, the grain boundary phase 4 is also referred to as an Nd-rich phase.

When the main phase 3a is an R—Co-based magnetic phase, 50 atomic % or more of the R element is preferable to be Sm. Thereby, the intrinsic coercive force of the magnet can be increased. The R—Co-based magnetic phase may have an $Sm_2Co_{17}$-type crystal phase, for example. The concentration of the R element of the grain boundary phase 4 is preferably higher than the concentration of the R element of the R—Co-based magnetic phase.

An average crystal grain size of the crystal grain 3 is 1.0 µm or less. By making the average crystal grain size of the crystal grain 3 small, the crystal grain size approximates a single-domain grain size of a magnetic phase to thereby suppress occurrence of an inverse domain, so that a high coercive force can be obtained. When the average crystal grain size exceeds 1.0 µm, the coercive force significantly decreases due to occurrence of the inverse domain in the crystal grain. The average crystal grain size is preferably 0.8 µm or less, further preferably 0.6 µm or less, still further preferably 0.5 µm or less, and yet further preferably 0.3 µm or less.

Further, in the permanent magnet of the embodiment, by controlling a degree of orientation of an easy magnetization axis direction of the crystal grain 3 in relation to an easy magnetization axis direction of the permanent magnet, the residual magnetization and the recoil magnetic permeability are controlled. The above-described degree of orientation is 15% or more and 90% or less. In the case of less than 15%, the residual magnetization of the magnet becomes too low. In the case of over 90%, the recoil magnetic permeability of the magnet becomes small. The degree of orientation is preferably in a range of 20% to 85%, further preferably in a range of 25% to 80%, and still further preferably in a range of 30% to 75%.

Figure 4:
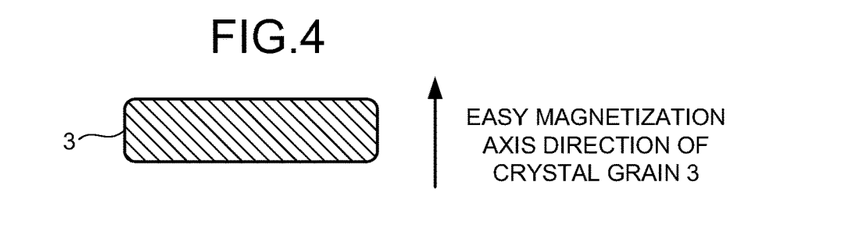
FIG. 4 is a view illustrating an easy magnetization axis direction of a crystal grain 3.
Figure 5:
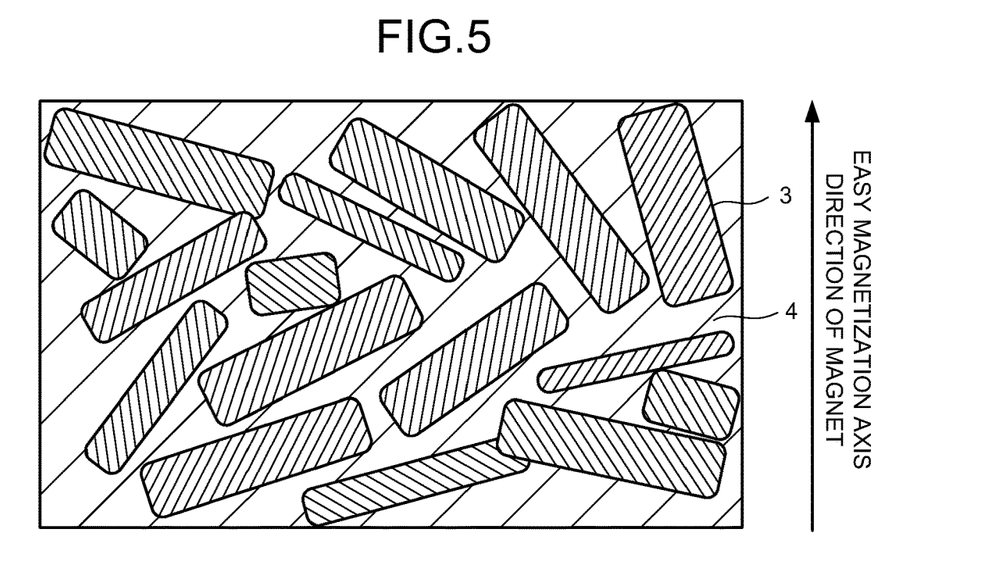
FIG. 5 is a view illustrating an example of a metal structure of a permanent magnet with a low degree of orientation.
Figure 6:
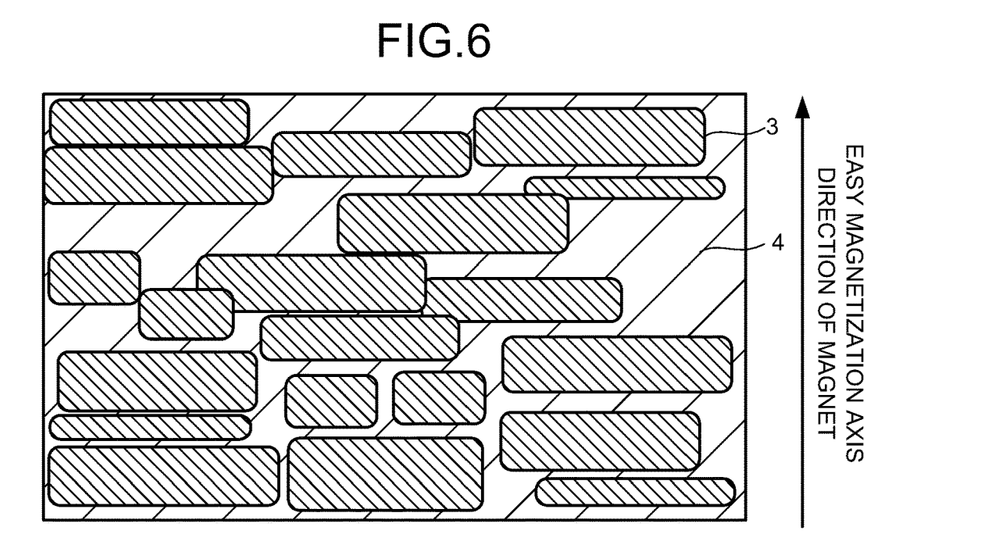
FIG. 6 is a view illustrating an example of a metal structure of a permanent magnet with a high degree of orientation.

FIG. 4 is a view illustrating an easy magnetization axis direction of a crystal grain 3, FIG. 5 is a view illustrating an example of a metal structure of a permanent magnet with a low degree of orientation, and FIG. 6 is a view illustrating an example of a metal structure of a permanent magnet with a high degree of orientation. An arrow illustrated in FIG. 4 indicates the easy magnetization axis direction of the crystal grain 3, while arrows illustrated in FIG. 5 and FIG. 6 indicate easy magnetization axis directions of the permanent magnets.

When the degree of orientation is 0%, as illustrated in FIG. 5, the easy magnetization axis directions of the crystal grains 3 are random, which is equivalent to an isotropy magnet. Since the residual magnetization of the magnet can be increased as the degree of orientation is higher, it is general, in an anisotropic magnet, to perform pressing while orienting crystal phases in a magnetic field or to perform pressure-deforming so that the easy magnetization axis directions of the crystal grains 3 are aligned as in FIG. 6, to thereby make the degree of orientation higher. In contrast, setting the degree of orientation within the predetermined above-described range can control the residual magnetization and the recoil magnetic permeability within the above-described range which enables suppression of a decrease in output at a time of high-speed rotation or reduction of a field weakening current in the case where a field weakening control method is used.

The degree of orientation is defined as follows. First, an arbitrary crystal grain having a main phase is selected and an easy magnetization axis direction is identified. Next, an angle between an easy magnetization axis direction of a magnet and the easy magnetization axis direction of the crystal grain (angle of degree of orientation $\theta_n$) is found. A value of $\theta_n$ is within a range of ±90 degrees when the easy magnetization axis direction of the magnet is set to 0 (zero) degree. Each angle of n number of crystal grains (n is about 100) is found by this method, to measure an angle of degree of orientation $\theta_1$ to an angle of degree of orientation $\theta_n$.

Next, a frequency distribution of the angle of degree of orientation $\theta_n$ is created. The frequency distribution is expressed by the number of the crystal grains having the angle of degree of orientation $\theta_n$ within a prescribed angle range, and the angle range is set to ±2.5 degrees. The number of the crystal grains in a range of −2.5 degrees to +2.5 degrees of the obtained frequency distribution is $N_{easy}$, and an average value of the number of crystal grains in respective angle ranges other than −2.5 degrees to +2.5 degrees is $N_{ave}$. The degree of orientation of the magnet is defined, by using $N_{easy}$, $N_{ave}$, and the number n of crystal grains, as a degree of orientation (%)=$(N_{easy}-N_{ave})/n \times 100$.

As described above, the permanent magnet of the embodiment has the crystal grain having the predetermined crystal grain size and degree of orientation and realizes the appropriate residual magnetization, the high recoil magnetic permeability, and the high intrinsic coercive force. Thus, it is possible to suppress a decrease in output in a rotary electric machine performing variable speed driving ranging from low speed to high speed. Further, it is possible to reduce an electric current for generating an opposing magnetic field when a field weakening control method is used.

Next, an example of a method of manufacturing the permanent magnet of the embodiment will be described. The permanent magnet of the embodiment can be manufactured by a manufacturing method which includes, for example, a process of performing hot working to a molded body of an R—Fe—B-based quenched ribbon or an R—Co-based quenched ribbon, for example.

The R—Fe—B-based quenched ribbon or the R—Co-based quenched ribbon is produced by high-frequency melting a material alloy and dropping it to a single roll or a twin roll. Not limited thereto, a commercially available ribbon may be used. The obtained quenched ribbon may be coarsely pulverized into several hundreds µm, filled in a metal mold and pressed at a pressure of 0.5 tons or more and 2 tons or less for example, and thereafter subjected to hot pressing. The hot pressing is performed by heating at a temperature of 600° C. or more and 1000° C. or less for 1 minute or more and 60 minutes or less under a pressure of 0.5 tons or more and 2 tons or less, for example. Thereafter, the molded body is cooled at a cooling rate of 1° C./min or more and 20° C./min or less, for example.

Hot working is performed to the obtained molded body. The hot working can be realized by filling magnet obtained by hot pressing in a larger metal mold to perform heating and pressurizing, for example. In place of being filled in the larger metal mold, the magnet obtained by hot pressing may be made smaller in size in a direction perpendicular to a pressurized face by grinding or cutting. The hot working can be realized by extrusion processing while heating the magnet obtained by hot pressing to have a ring shape or a bar shape. The hot working is achieved by performing heating at a pressure of 0.5 tons or more and 5 tons or less at a temperature of 650° C. or more and 1000° C. or less for one minute or more and 60 minutes or less and cooling at a cooling rate of 1° C./min or more and 20° C./min or less, for example.

Figure 7:
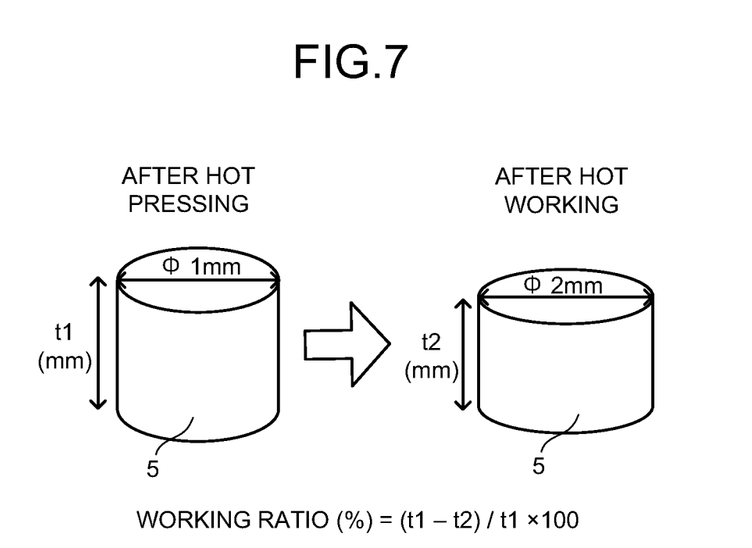
FIG. 7 is a view for explaining a working ratio.

In hot working, a degree of orientation of a magnet can be controlled by controlling a working ratio of a molded body. FIG. 7 is a view for explaining the working ratio in hot working. For example, in the case where a height direction of a molded body 5 is a pressing direction, when a height after hot pressing is a height t1 and a height after hot working is a height t2, a working ratio (%) is expressed by (t1−t2)/t1×100. The working ratio is preferably 2% or more and 45% or less, further preferably 4% or more and 30% or less, and still further preferably 5% or more and 25% or less.

By the above-described process, the permanent magnet of the embodiment can be obtained.

The obtained magnet may be subjected to a heat treatment of heating at a temperature of 650° C. or more and 1000° C. or less for five minutes or more and 60 minutes or less and cooling at a cooling rate of 1° C./min or more and 20° C./min or less. By performing the above-described heat treatment, controllability of a grain size distribution of crystal grains or the like is increased, so that a magnetic property such as a recoil magnetic permeability can be enhanced. The above-describe heat treatment may be performed after hot pressing.

A general object of hot working or hot pressing in which a quenched ribbon is used is to increase an coercive force by producing a magnet having a crystal size nearly equal to or less than a single-domain critical grain size, to increase a heat resistance, to suppress coarsening of a grain size, or to uniformize a distribution. Accordingly, a recoil magnetic permeability of a magnet having uniformized crystal grains 3 is likely to be low. In contrast, by the manufacturing method of the permanent magnet of the embodiment, magnetic properties such as a recoil magnetic permeability can be enhanced by controlling the degree of orientation of the crystal grain 3 within an appropriate range.

In the permanent magnet of the embodiment, in place of the aforementioned quenched ribbon, a fine crystal grain alloy obtained by a hydrogenation-decomposition-desorption-recombination (HDDR) method may be used as a material, and fine powder which has been pulverized to about a single domain critical grain size may be used as a material.

The HDDR method is a method of producing fine crystal particles by performing hydrogenation-decomposition-desorption-recombination to a material, where a heat treatment is performed to a material alloy, at a temperature of 700° C. or more and 1000° C. or less for 30 minutes or more and 10 hours or less in a hydrogen atmosphere to achieve hydrogenation and decomposition, and thereafter, heat treatment is performed at a temperature of 700° C. or more and 1000° C. or less for 30 minutes or more and 10 hours or less in a reduced-pressure Ar atmosphere to achieve desorption and recombination. Examples of a method of producing fine powder include a method of grinding by a jet mill using He gas, and so on.

A degree of orientation can also be controlled by orienting the pulverized magnet powder by molding in magnetic field. The above-described degree of orientation can be realized by making an application magnetic field at a time of molding in magnetic field have an appropriate strength in correspondence with a powder size. The above-described degree of orientation can also be realized by reversing application magnetic fields alternately and weakening them gradually. The degree of orientation can be controlled by an attenuation proportion of a reversed magnetic field.

A composition of a permanent magnet can be measured by, for example, inductively coupled plasma-atomic emission spectroscopy (ICP-AES), scanning electron microscope-energy dispersive X-ray spectroscopy (SEM-EDX), transmission electron microscope-energy dispersive X-ray spectroscopy (TEM-EDX), scanning transmission electron microscope-energy dispersive X-ray spectroscopy (STEM-EDX), or the like. A volume ratio of each phase is determined by using both observation by an electron microscope or an optical microscope and X-ray diffraction in a comprehensive manner, and can be obtained by an areal analysis method of an electron micrograph capturing a cross section of the permanent magnet. Used as the cross section of the permanent magnet is a cross section of a practically center part of a face having the largest area of a sample.

The metal structure of the main phases 3a, the grain boundary phases 4, and so on is recognized, for example, as follows. First, observation of a sample is performed with a scanning transmission electron microscope (STEM). At this time, positions of the grain boundary phases are specified by observing the sample with a SEM, and the sample is processed by using focused ion beams (FIB) so that the grain boundary phases come into view, thereby allowing observation efficiency to be enhanced. On this occasion, the sample is preferably a non-magnetized article. Observation conditions are set to, for example, an acceleration voltage of 200 kV and a measurement area of 30 μm×30 μm. Next, a concentration of each of elements in the sample is measured by using, for example, STEM-EDX.

In measuring the concentration of each of the elements by the STEM-EDX, a sample for measurement is cut out from the 1 mm or more inside of a face of the sample. Further, a face parallel to an easy magnetization axis (c axis) is observed with an observation magnification of 100 k times. Next, mapping of each of the elements in the same field of view is performed, and each of the phases is specified, to measure the concentration of each of the elements in the phases.

The degree of orientation of the crystal grain can be measured by a STEM image or a SEM-electron backscattering pattern (SEM-EBSP) which uses SEM. Here, a method of calculating from the STEM image will be explained with an example. A face parallel to an easy magnetization axis of a magnet is observed. An easy magnetization axis direction of the magnet is a processing direction in the case of hot working and a magnetic field application direction in the case of molding in magnetic field. Here, the processing direction is a pressurization direction in the case where a column-shaped molded body after hot pressing is pressurized further to be compressed in a height direction, thereby deforming the molded body. In the obtained STEM image, one crystal grain is selected and an easy magnetization axis direction of that crystal grain is identified. An easy magnetization axis of the crystal grain can be identified, for example, by the following method. The crystal grain is approximated by a rectangle contacting an outer periphery of the selected crystal grain. At this time, a tangent to the outer periphery of the crystal grain is set so that an area of the rectangle may become minimum. A shorter side direction of the obtained rectangle is defined as the easy magnetization axis direction of that crystal grain. Otherwise, a direction perpendicular to a major axis direction of the selected crystal grain is defined as the easy magnetization axis direction of that crystal grain. Here, the major axis direction is a direction in which a length of a straight line connecting end portions of the crystal grain is largest. Otherwise, a crystal structure of the selected crystal grain is identified, and an easy magnetization axis direction derived from that crystal structure is defined as the easy magnetization axis direction of that crystal grain. An angle between the easy magnetization axis direction of the crystal grain which has been identified as above and the easy magnetization axis direction of the magnet is the above-described angle of direction of orientation ($\theta_n$) of that crystal grain. The ones in each of which the whole of the crystal grain can be confirmed in an observation range are measured, and about 100 points are measured in one magnet to obtain $θ_n$, and the degree of orientation of the magnet is calculated from the above-described method.

Second Embodiment

The permanent magnet of the first embodiment can be used for a rotary electric machine such as various motors or a generator. In addition, it can also be used as a stationary magnet or a variable magnet of a variable magnetic flux motor. The various motors are configured by using the permanent magnet of the first embodiment. When the permanent magnet of the first embodiment is applied to the variable magnetic flux motor, the techniques disclosed in Japanese Laid-open Patent Publication No. 2008-29148 and Japanese Laid-open Patent Publication No. 2008-43172 can be applied to the configuration of the variable magnetic flux motor and a drive system, for example.

Figure 8:
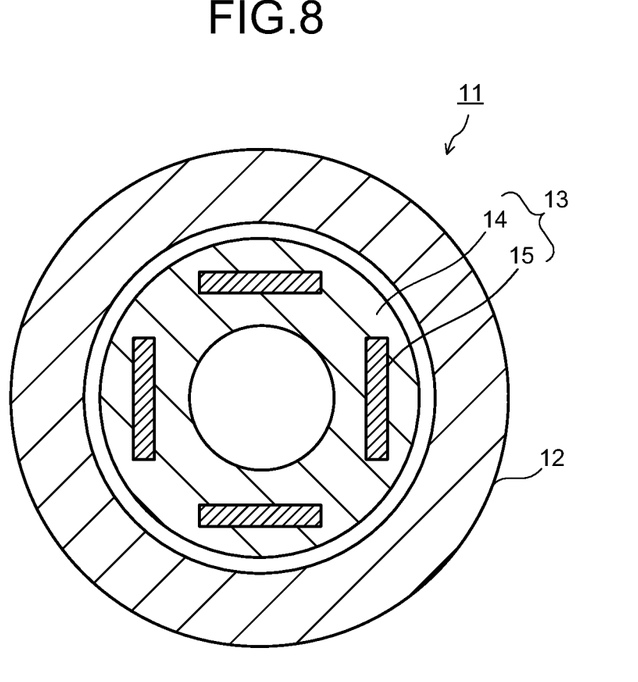
FIG. 8 is a view illustrating an example of a permanent magnet motor.

Next, a motor and a generator including the above-described permanent magnet will be explained with reference to the drawings. FIG. 8 is a view illustrating a permanent magnet motor. In a permanent magnet motor 11 illustrated in FIG. 8, a rotor 13 is disposed in a stator 12. In an iron core 14 of the rotor 13, permanent magnets 15 which are the permanent magnets of the first embodiment are disposed. A magnetic flux density (flux quantum) of the permanent magnet 15 is allowed to be variable. The permanent magnet 15 is not affected by a Q-axis current but can be magnetized by a D-axis current because a magnetization direction thereof is perpendicular to a Q-axis direction. The rotor 13 is provided with a magnetization winding (not illustrated). There is made the structure in which by passing an electric current from a magnetization circuit to this magnetization winding, its magnetic field acts directly on the permanent magnets 15.

As the permanent magnet 15, the permanent magnet of the first embodiment can be used. This makes it possible to suppress a decrease in output at a time of high-speed rotation even when variable speed driving ranging from low speed to high speed is performed.

Figure 9:
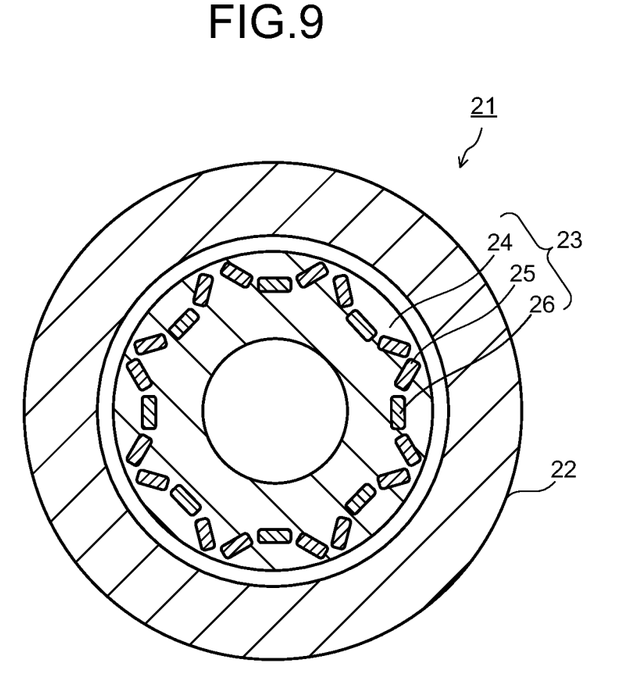
FIG. 9 is a view illustrating an example of a variable magnetic flux motor.

FIG. 9 is a view illustrating a variable magnetic flux motor. In a variable magnetic flux motor 21 illustrated in FIG. 9, a rotor 23 is disposed in a stator 22. In an iron core 24 of the rotor 23, the permanent magnets of the first embodiment are disposed as stationary magnets 25 and variable magnets 26. A magnetic flux density (flux quantum) of the variable magnet 26 is allowed to be variable. The variable magnet 26 is not affected by a Q-axis current but can be magnetized by a D-axis current because a magnetization direction thereof is perpendicular to a Q-axis direction. The rotor 23 is provided with a magnetization winding (not illustrated). There is made the structure in which by passing an electric current from a magnetization circuit to this magnetization winding, its magnetic field acts directly on the variable magnets 26.

According to the permanent magnet of the first embodiment, it is possible to obtain a coercive force suitable for the stationary magnet 25. When the permanent magnet of the first embodiment is applied to the variable magnet 26, it is sufficient that, for example, the coercive force is controlled in a range of 100 kA/m or more and 500 kA/m or less by changing manufacturing conditions. Note that in the variable magnetic flux motor 21 illustrated in FIG. 9, the permanent magnet of the first embodiment can be used for both the stationary magnet 25 and the variable magnet 26, and the permanent magnet of the first embodiment may be used for either one of the magnets. Because the variable magnetic flux motor 21 is capable of outputting large torque with a small apparatus size, it is suitable for a motor of a hybrid vehicle, an electric vehicle, or the like required to have a high-output and compact motor.

Figure 10:
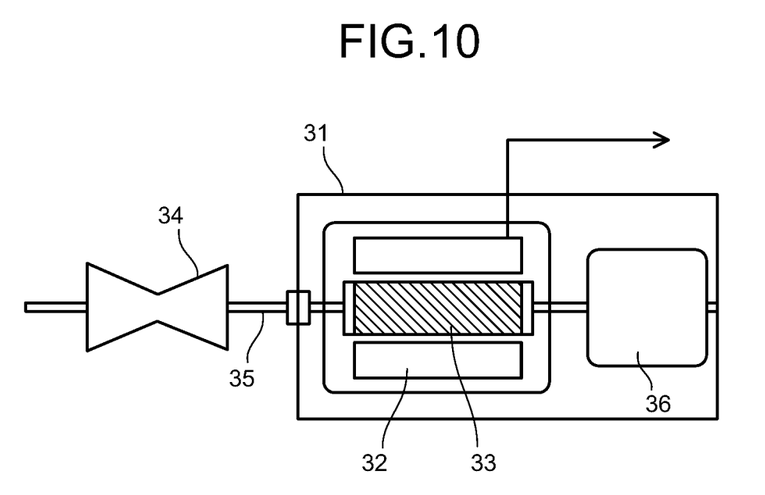
FIG. 10 is a view illustrating an example of a generator.

FIG. 10 illustrates a generator. A generator 31 illustrated in FIG. 10 includes a stator 32 using the above-described permanent magnet. A rotor 33 disposed inside the stator 32 is connected via a shaft 35 to a turbine 34 provided at one end of the generator 31. The turbine 34 is rotated by, for example, fluid supplied from the outside. Note that in place of the turbine 34 rotated by the fluid, the shaft 35 can also be rotated by transferring dynamic rotation such as regenerated energy of an automobile. Various publicly-known configurations can be employed for the stator 32 and the rotor 33.

The shaft 35 is in contact with a commutator (not illustrated) disposed on the opposite side to the turbine 34 in relation to the rotor 33, so that an electromotive force generated by rotation of the rotor 33 is boosted to a system voltage and is transferred as an output from the generator 31 via an isolated phase bus and a main transformer (not illustrated). The generator 31 may be either of an ordinary generator and a variable magnetic flux generator. Note that the rotor 33 generates an electrostatic charge by static electricity from the turbine 34 and an axial current accompanying power generation. Therefore, the generator 31 includes a brush 36 for discharging the electrostatic charge of the rotor 33.

As described above, by applying the above-described permanent magnet to the generator, effects such as high efficiency, downsizing, and low cost are obtained.

Figure 11:
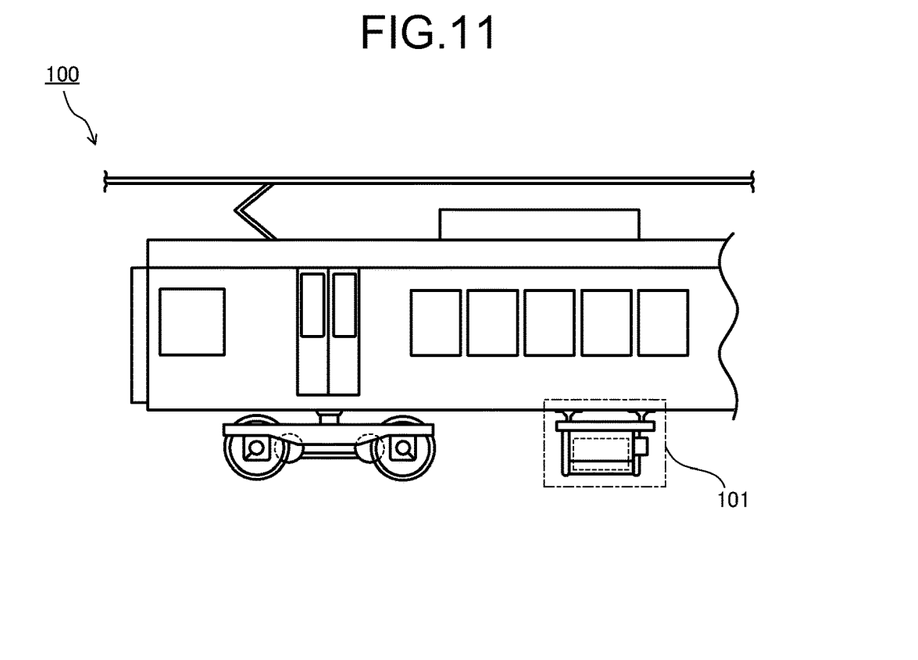
FIG. 11 is a schematic view illustrating a configuration example of a railway vehicle.

The above-described rotary electric machine may be mounted on, for example, a railway vehicle (one example of the vehicle) to be used for railway traffic. FIG. 11 is a view illustrating one example of a railway vehicle 100 including a rotary electric machine 101. As the rotary electric machine 101, the motors in FIGS. 8 and 9, the generator in FIG. 10, and the like described above can be used. When the above-described rotary electric machine is mounted as the rotary electric machine 101, the rotary electric machine 101 may be used as, for example, a motor which outputs a driving force by using electric power supplied from an overhead wire or electric power supplied from a secondary battery mounted on the railway vehicle 100, or may be used as a generator which converts kinetic energy into electric power and supplies the electric power to various loads in the railway vehicle 100. Using such a high-efficient rotary electric machine as the rotary electric machine of the embodiment allows the railway vehicle to travel in an energy-saving manner.

Figure 12:
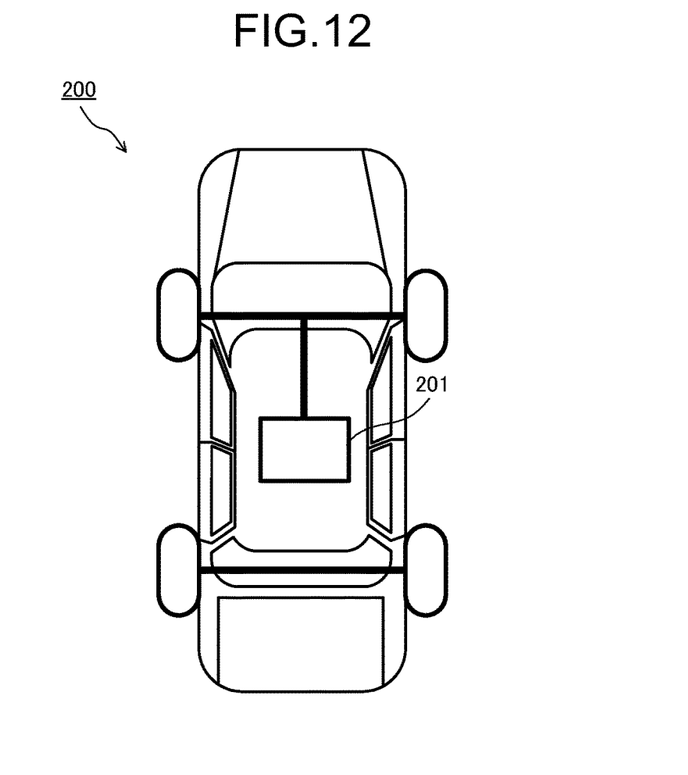
FIG. 12 is a schematic view illustrating a configuration example of an automobile.

The above-described rotary electric machine may be mounted on an automobile (another example of the vehicle) such as a hybrid vehicle or an electric vehicle. FIG. 12 is a view illustrating one example of an automobile 200 including a rotary electric machine 201. As the rotary electric machine 201, the motors in FIGS. 8 and 9, the generator in FIG. 10, and the like described above can be used. When the above-described rotary electric machine is mounted as the rotary electric machine 201, the rotary electric machine 201 may be used as a motor which outputs driving force of the automobile 200 or a generator which converts kinetic energy when the automobile 200 travels into electric power. In addition, the above-described rotary electric machine may be mounted on, for example, industrial equipment (industrial motor), an air-conditioning apparatus (air conditioner and water heater compressor motor), a wind power generator, or an elevator (hoist).

EXAMPLE

Example 1

A master alloy ribbon produced by a quenching method and having a desired composition as well as an $Nd_2Fe_{14}B$-type crystal phase was pulverized into 150 μm or less. A φ 10 mm column-shaped metal mold was filled with the obtained powder. The metal mold filled with the powder was set in a hydraulic press machine placed in a controlled atmosphere heat treatment furnace, and was compressed at a pressure of 2 tons in a vacuum. Thereafter, the interior of the furnace was heated to 700° C. in a vacuum and retained for 5 minutes. After heating and retaining, by cooling to a room temperature at a cooling rate of 2° C./min, a compression-molded body was obtained. After a circumference of the obtained molded body was ground and processed so that the above-described working ratio becomes 24%, the molded body was put in the φ 10 mm column-shaped metal mold again, set in the hydraulic press machine placed in the controlled atmosphere heat treatment furnace again, and compressed at a pressure of 3 tons while the interior of the furnace was heated to 700° C. in a vacuum, and then retained for 5 minutes. After heating and retaining, by introducing an Ar gas and cooling to a room temperature at a cooling rate of 5° C./min, a magnet was obtained. Further, an average crystal grain size, a degree of orientation, a residual magnetization, and a recoil magnetic permeability, and a coercive force were measured, respectively. Results thereof are listed in Table 1.

Example 2

A master alloy ribbon produced by a quenching method and having a desired composition as well as an $Nd_2Fe_{14}B$-type crystal phase was pulverized into 150 μm or less. A φ 10 mm column-shaped metal mold was filled with the obtained powder. The metal mold filled with the powder was set in a hydraulic press machine placed in a controlled atmosphere heat treatment furnace, and was compressed at a pressure of 2 tons in a vacuum. Thereafter, the interior of the furnace was heated to 700° C. in a vacuum and retained for 5 minutes. After heating and retaining, by cooling to a room temperature at a cooling rate of 2° C./min, a compression-molded body was obtained. After a circumference of the obtained molded body was ground and processed so that the above-described working ratio becomes 5%, the molded body was put in the φ 10 mm column-shaped metal mold again, set in the hydraulic press machine placed in the controlled atmosphere heat treatment furnace again, and compressed at a pressure of 3 tons while the interior of the furnace was heated to 730° C. in a vacuum, and then retained for 5 minutes. After heating and retaining, by introducing an Ar gas and cooling to a room temperature at a cooling rate of 5° C./min, a magnet was obtained. Further, an average crystal grain size, a degree of orientation, a residual magnetization, and a recoil magnetic permeability, a coercive force were measured, respectively. Results thereof are listed in Table 1.

Comparative Example 1

A master alloy ribbon produced by a quenching method and having a desired composition as well as an $Nd_2Fe_{14}B$-type crystal phase was pulverized into 150 μm or less. A φ 10 mm column-shaped metal mold was filled with the obtained powder. The metal mold filled with the powder was set in a hydraulic press machine placed in a controlled atmosphere heat treatment furnace, and was compressed at a pressure of 2 tons in a vacuum. Thereafter, the interior of the furnace was heated to 700° C. in a vacuum and retained for 5 minutes. After heating and retaining, by cooling to a room temperature at a cooling rate of 2° C./min, a compression-molded body was obtained. After a circumference of the obtained molded body was ground and processed so that the above-described working ratio becomes 50%, the molded body was put in the φ 10 mm column-shaped metal mold again, set in the hydraulic press machine placed in the controlled atmosphere heat treatment furnace again, and compressed at a pressure of 3 tons while the interior of the furnace was heated to 780° C. in a vacuum, and then retained for 5 minutes. After heating and retaining, by introducing an Ar gas and cooling to a room temperature at a cooling rate of 5° C./min, a magnet was obtained. Further, an average crystal grain size, a degree of orientation, a residual magnetization, a recoil magnetic permeability, and a coercive force were measured, respectively. Results thereof are listed in Table 1.

In Examples 1 and 2, the obtained magnet has the $Nd_2Fe_{14}B$-type crystal phase as the main phase as well as the above-described composition and the metal structure illustrated in FIG. 3, the average crystal grain size is 1.0 μm or less, and the degree of orientation is in a range of 15% to 90%. Further, the recoil magnetic permeability is 1.13 or more, the residual magnetization is 0.8 T or more and less than 1.16 T, and the intrinsic coercive force is 850 kA/m or more. As described above, manufacturing the permanent magnet by hot pressing and hot working enables control of the average crystal grain size and the degree of orientation, resulting in that the high recoil magnetic permeability, the appropriate residual magnetization, and the sufficient coercive force can be obtained. Therefore, in a rotary electric machine performing variable speed driving ranging from low speed to high speed, a decrease in output can be suppressed. Further, it is possible to reduce an electric current for generating an opposing magnetic field when a field weakening control method is used.

TABLE 1

|  | Average Crystal Grain Size [μm] | Degree of Orientation [%] | Residual Magnetization [T] | Recoil Magnetic Permeability | Intrinsic Coercive Force [kA/m] |
| --- | --- | --- | --- | --- | --- |
| Example 1 | 0.35 | 70 | 1.0 | 1.16 | 1000 |
| Example 2 | 0.45 | 30 | 0.87 | 1.19 | 1000 |
| Comparative Example 1 | 0.6 | 93 | 1.1 | 1.05 | 1100 |

What is claimed is:

1. A permanent magnet comprising
crystal grains including a main phase, wherein
an average size of the crystal grains is 1.0 μm or less,
a degree of orientation of easy magnetization axes of the crystal grains to an easy magnetization axis of the magnet is 15% or more and 90% or less, the degree being defined by $(N_{easy}-N_{ave})/n \times 100$, $N_{easy}$ being the number of crystal grains in an angle range of −2.5 degrees to +2.5 degrees of a frequency distribution, $N_{ave}$ being an average value of the number of crystal grains in each angle range other than −2.5 degrees to +2.5 degrees of the frequency distribution, n being the number of measured crystal grains, the frequency distribution being obtained by measuring an angle between an easy magnetization axis direction of the magnet and the easy magnetization axis direction of each crystal grain, and the angle ranges being obtained by dividing the measured angles into a plurality of angle ranges every ±2.5 degrees, and
a recoil magnetic permeability is 1.13 or more, a residual magnetization is 0.8 T or more and less than 1.16 T, and an intrinsic coercive force is 850 kA/m or more.

2. The magnet according to claim 1,
wherein the main phase is an R—Fe—B-based magnetic phase,
where R is at least one element selected from the group consisting of Nd, Pr, Dy, Tb, and Ho.

3. The magnet according to claim 2,
wherein the R—Fe—B-based magnetic phase is an $Nd_2Fe_{14}B$-type crystal phase.

4. The magnet according to claim 2, further comprising a grain boundary phase,
wherein a concentration of the R element of the grain boundary phase is higher than a concentration of the R element of the main phase.

5. The magnet according to claim 1,
wherein the main phase is an R—Co-based magnetic phase,
where R is at least one element selected from the group consisting of rare earth elements.

6. The magnet according to claim 5,
wherein the R—Co-based magnetic phase is an $Sm_2Co_{17}$-type crystal phase.

7. The magnet according to claim 5, further comprising a grain boundary phase,
wherein a concentration of the R element of the grain boundary phase is higher than a concentration of the R element of the main phase.

8. A rotary electric machine comprising:
a stator; and
a rotor,
wherein the stator or the rotor has the permanent magnet according to claim 1.

9. The rotary electric machine according to claim 8,
wherein the rotor is connected to a turbine via a shaft.

10. A vehicle comprising the rotary electric machine according to claim 8.

11. The vehicle according to claim 10,
wherein the rotor is connected to a shaft, and
wherein rotation is transferred to the shaft.

12. The magnet according to claim 1,
wherein the residual magnetization is 0.8 T or more and less than 1.0 T.

* * * * *